United States Patent
Yehuda et al.

(10) Patent No.: US 7,289,435 B2
(45) Date of Patent: Oct. 30, 2007

(54) METHOD AND SYSTEM FOR MANIFESTING ALARMS IN A TELECOMMUNICATION NETWORK

(75) Inventors: Eitan Yehuda, Zoran (IL); Idan Kaspit, Rosh Ha'ayin (IL); Eli Korall, Shimshon (IL)

(73) Assignee: ECI Telecom Ltd, Petach Tikva (IL)

( * ) Notice: Subject to any disclaimer, the term of this patent is extended or adjusted under 35 U.S.C. 154(b) by 1057 days.

(21) Appl. No.: 10/149,516

(22) PCT Filed: Jan. 11, 2001

(86) PCT No.: PCT/IL01/00027

§ 371 (c)(1),
(2), (4) Date: Jun. 12, 2002

(87) PCT Pub. No.: WO01/56206

PCT Pub. Date: Aug. 2, 2001

(65) Prior Publication Data

US 2002/0191648 A1 Dec. 19, 2002

(30) Foreign Application Priority Data

Jan. 25, 2000 (IL) .................................... 134217

(51) Int. Cl.
*G01R 31/08* (2006.01)
(52) U.S. Cl. .......................... 370/222; 370/244
(58) Field of Classification Search ............ 370/222, 370/223, 242, 244

See application file for complete search history.

(56) References Cited

U.S. PATENT DOCUMENTS

| 5,537,393 | A | * | 7/1996 | Shioda et al. ............... 370/223 |
| 5,619,532 | A | | 4/1997 | Tani et al. |
| 5,636,203 | A | * | 6/1997 | Shah ......................... 370/244 |
| 5,710,759 | A | | 1/1998 | Chopping et al. |
| 5,923,646 | A | | 7/1999 | Mandhyan .................. 370/254 |
| 6,009,075 | A | * | 12/1999 | Roberts et al. ............. 370/219 |
| 6,021,112 | A | | 2/2000 | Sugawara |
| 6,169,753 | B1 | * | 1/2001 | Yoshida ..................... 370/507 |

FOREIGN PATENT DOCUMENTS

JP 10-23053 1/1998

* cited by examiner

*Primary Examiner*—Brian Nguyen
(74) *Attorney, Agent, or Firm*—Harold L. Novick; The Nath Law Group

(57) ABSTRACT

A method and a Network Element (NE) for manifesting alarms by forming a so called combined Data Quality Byte (DQB) for a particular SDH/SONET data transmission stream. The DQB indicates status of alarms at a particular location of the telecommunication network, via which the stream is transmitted. The DQB can be formed by arranging a plurality of alarm signals, currently actual for the particular data transmission stream, in a predetermined byte associated with the stream frame. The NE, upon receiving from an upstream network element a data transmission stream with its DQB1 formed upstream, creates an updated DQB2 and compares DQB1 with DQB2 to manifest an alarm status change ΔDQB for estimating quality of transmission via the network section.

22 Claims, 5 Drawing Sheets

TU-11

| V1 |
|---|
| 78 |
| ⋮ |
| 103 |
| V2 |
| 0 |
| ⋮ |
| 25 |
| V3 |
| 26 |
| ⋮ |
| 51 |
| V4 |
| 52 |
| ⋮ |
| 77 |

| V1 |
|---|
| 105 |
| ⋮ |
| 139 |
| V2 |
| 0 |
| ⋮ |
| 34 |
| V3 |
| 35 |
| ⋮ |
| 69 |
| V4 |
| 70 |
| ⋮ |
| 104 |

| V1 |
|---|
| 321 |
| ⋮ |
| 427 |
| V2 |
| 0 |
| ⋮ |
| 106 |
| V3 |
| 107 |
| ⋮ |
| 213 |
| V4 |
| 214 |
| ⋮ |
| 320 |

FIG.3C

| | BIT7 | BIT6 | BIT5 | BIT4 | BIT3 | BIT2 | BIT1 | BIT0 |
|---|---|---|---|---|---|---|---|---|
| DESIGNATION | SSF | SF1 | — | SF2 | SF/SD | SD1 | SD2 | — |

METHOD AND SYSTEM FOR MANIFESTING ALARMS IN A TELECOMMUNICATION NETWORK

FIELD OF THE INVENTION

The present invention relates to a method and system for detecting troubles or non-stable transmission in transport communication networks based on SDH and SONET standards, and in particular—for manifesting alarms in the network.

BACKGROUND OF THE INVENTION

Synchronous Optical NETwork (SONET) and Synchronous Digital Hierarchy (SDH) describe two families of closely related and compatible standards that govern interface parameters; rates, formats and multiplexing methods; operations, administration, maintenance and provisioning for high-speed signal transmission. SONET is primarily a set of North American standards with a fundamental transport rate beginning at approximately 52 Mb/s (i.e., 51.84 Mb/s), while SDH, principally used in Europe and Asia, defines a basic rate near 155 Mb/s (to be precise, 51.84×3=155.52 Mb/s). From a transmission perspective, together they provide an international basis for supporting both existing and new services in the developed and developing countries.

For transmitting data, SDH and SONET use frame formats transmitted every 125 μs (8000 frames/sec). Because of compatibility between SDH and SONET, their basic frames are similarly structured, but differ in dimension which fact reflects the basic transmission rates of 155.52 and 51.84 Mb/s, respectively. To be more specific, a basic frame format of SDH is 9 rows of 270 bytes, or 2430 bits/frame, corresponding to an aggregate frame rate of 155.52 Mb/s. For SDH systems, the mentioned basic frame transmitted at the rate 155.52 Mb/s forms the fundamental building block called Synchronous Transport Module Level-1 (STM-1). For SONET systems, the basic frame has dimensions of 9 rows by 90 byte columns and, being transmitted at the rate 51.84 Mb/s, forms the appropriate fundamental building block called Synchronous Transport Signal Level-1 (STS-1).

Lower rate payloads (data portions transmitted at rates smaller than the basic ones) are mapped into the fundamental building blocks, while higher rate signals are generated by synchronously multiplexing N fundamental building blocks to form STM-N signals (in SDH) or STS-N signals (in SONET).

Each basic frame in SONET or SDH comprises an information portion called Information Payload and a service portion called Overhead (OH), the latter being subdivided into a number of areas of overhead bytes (for example, Path Overhead—POH, Transport Overhead—TOH) predestined for various service and control functions. One of such areas is a column of Path Overhead (POH) usually residing within the Information Payload area. POH supports performance monitoring, status feedback, signal labeling, user channel and a tracing function in a path. This overhead is added and dismantled at or near the service origination/termination points defining the path, and is not processed at intermediary nodes.

The SDH multiplexing structure, defined in ITU-T Recommendation G.707(03/96), comprises so-called virtual containers serving to combine lower rate payloads such as by mapping into these containers and adding POH. The combined payloads fitted with POH are further aligned and multiplexed in order to form an STM-N signal. The STM-N signal can be obtained either by multiplexing AU-3 signal (accepted also in SONET) by 3N, or by multiplexing N signals AU-4. AU-4 is formed by adding pointers to a VC-4 signal (virtual container level-4). Similarly, the AU-3 signal is formed from VC-3 by adding AU-3 pointers. Lower level signals TU-11, TU-12, TU-2 and TU-3, which are formed by adding respective pointers to lower level virtual containers VC-11, VC-12, VC-2 and VC-3, in their turn serve as components for composing the higher level virtual containers VC-3 or VC-4.

According to ITU-T Recommendation G.707(03/96), the POH of virtual containers consists of a plurality of bytes, most of which are used for end-to-end communication. For example, when an error is detected at a path terminating equipment (PTE), an Alarm Indication Signal (AIS) is to be transmitted to the downstream network elements, and a signal of Remote Defect Indication (RDI)—towards the upstream network elements. The AIS is stated to be in the form of all "1"-s sent in the payload associated with this path, and the RDI is a code sent in the path status byte G1 assigned in the POH for this purpose. In SONET, the Transport overhead layer which is responsible for transport through the network, is broken into two parts—Line Overhead (LOH) and Section Overhead (SOH). Section overhead (SOH) is that overhead necessary for reliable communication between network elements such as terminals and regenerators. Line overhead (LOH) was established to allow reliable communication of necessary information between more complicated network elements such as terminals, digital cross-connects, multiplexers and switches. In SDH, no Transport overhead is directly defined. However, any SDH basic frame comprises a Multiplex Section Overhead (MSOH) being analogous to LOH in SONET, and a Regenerator Section Overhead (RSOH) which play the part of SOH in SONET. FIG. 4 schematically illustrates an STM-1 frame with its overhead sections. It is therefore considered, that the layer of Transport overhead in SDH is actually formed by the mentioned MSOH and RSOH. POH column is considered a part of STM-1 payload. There is also a row of overhead bytes bearing information on so-called AU-pointers (administrative unit pointers) which are considered to belong neither to TOH nor to POH, and are analyzed separately. Some of overhead bytes (for example, a number of SOH bytes) are reserved for future use.

During decoding and checking of a SONET or SDH signal transmitted in a path, it is generally "stripped down" in layers by a control system, first decoding and checking the section information, then the line information and thereafter the path information. At each step, error checking is provided and errors (if detected) must be indicated either to the local control system, or to the originating path terminal element to inform about troubles in the path.

Such a concept has a problem that many network elements positioned upstream and downstream of a particular network element, where a trouble has been first revealed, receive information on this trouble (as well as other troubles found in the path) without knowing its source. As a result, the network manager system (NMS) should establish additional communication to the network elements for exactly determining which of them reported each of the particular faults. These extra interactions require extra time and complicate the network operation. It goes without saying that exact information on troublesome sections of the network is extremely important for its management.

Standards and Recommendations dealing with SDH and SONET transmission systems do not describe or suggest particular solutions to the problem outlined above.

Another problem, which is known to those skilled in the art, stems from the fact that important information to be passed via a network is quite often transmitted via at least two alternate routes. One of the alternate data streams is usually to be selected at points of cross-connect and destination. In such cases, where a data stream (trail) is transmitted via two or more alternative paths, information on the respective quality of transmission would be of great importance: whenever one stream is to be selected out of those transmitted via the alternative paths, the information characterizing a so-called "trouble rank" or "data quality" of these alternative paths could be used.

U.S. Pat. No. 5,710,759 describes a switch protection arrangement. Digital information transmitted via an SDH network arrives to the input of the switch in the form of a data frame. This input information in the frame is reorganized within the switch and checked for parity by using a V4 overhead byte of the frame before being issued from the switch. The procedure is proposed for selecting one of receive signals formed at the switch via two alternative channels by checking the presence or absence of a code error in each of the signals. The arrangement described in the US patent is intended for checking the switch equipment, and not the transmitted data. Namely, the test data byte is used to assist in determination of whether the switch paths are routed and operating correctly.

Recommendations Nos. ITU-T G.707 and G.783 of Telecommunication Standardization Sector of the International Telecommunication Union (ITU-T) do not provide technological solutions as of how data streams transmitted via alternative paths could be sorted.

OBJECT OF THE INVENTION

It is the object of the invention to propose such a way of manifesting alarms in a network, which would enable resolving the above outlined problems.

SUMMARY OF THE INVENTION

The above object can be achieved by providing a method and a Network Element (NE) for manifesting alarms by forming a combined Data Quality Byte (DQB) for a particular data transmission stream. The DQB would indicate status of alarms at a particular location of the telecommunication network, via which the stream is transmitted.

Other aspects of the invention will become apparent from the description that follows below.

There is provided a method for manifesting alarms in telecommunication networks operating according to digital transmission systems SDH/SONET, the method comprises arranging a combined alarm status byte called Data Quality Byte (DQB) of a data transmission stream, the DQB being arranged in a predetermined byte or a portion thereof associated with said stream's frame and bearing indications of one or more alarm signals currently actual for said data transmission stream.

The above method can be performed at one or more network elements forming the telecommunication network.

The above-mentioned data transmission stream may be, for example, the following SDH data transmission streams: VC4 (including VC4-x regular and VC4-xc concatenated), VC3, VC2, VC11, VC12, etc.

The DQB can be formed in one of stuff bytes comprised either in the standard frame of the above stream, or in one of the higher level streams formed on the base of such stream.

For example, for VC4 a higher level stream can be the STMx; the bytes are in the SOH of the STMx. Another example is where the higher level stream is TU3 being formed on the base of the stream VC3, and the Data Quality Byte is formed in one of stuff bytes comprised in the standard frame of the TU3 stream. According to yet another example, the mentioned higher level stream is one of the TU2, TU11 and TU12 streams, and the Data Quality byte is formed in V3 or V4 byte in the standard frame of these respective streams.

According to one version of the method of manifesting alarms, it is intended for so-called network coordination and comprises the following steps to be performed at least at one of the network elements:

receiving, from an upstream network element, the Data Quality Byte (DQB1) formed according to the method in the data transmission stream, forming, at said network element and according to the method, an updated Data Quality Byte (DQB2) actual for the received data transmission stream, and comparing the DQB1 received from the upstream network element with the updated DQB2 formed at said network element to manifest an alarm status change ΔDQB, thereby enabling simplified monitoring of the network for allocating particular portions thereof where new alarms are generated.

It should be noted that the more network elements are provided with the above ability, the more updated (coordinated) will be the network from the point of the alarm status.

Preferably, the above-described version further comprises a step of transmitting the updated DQB2 downstream, with the data transmission stream outgoing from said network element.

According to another version of the inventive method, it is intended for protecting data transmitted via alternative paths in the network; in such a case the following steps are provided:

performing the method with respect to two or more originally identical data streams transmitted via alternative paths, thereby obtaining two or more respective Data Quality Bytes (DQB);

comparison of the respective two or more Data Quality Bytes (DQB) of said streams to determine the best Data Quality Byte, and selecting from said streams, for further use, the stream with the best Data Quality Byte.

The comparison can be made at a point of destination, regeneration, add-drop multiplexing, but typically—at a point of cross-connection. The best Data Quality byte is considered to be a Data Quality Byte of one of the compared data streams, with the combined alarm corresponding to the less harmful defects in the data transmission stream, at least among those which are considered after a so-called masking.

For the version of protecting data transmitted in alternative paths, the DQB can be formed in a higher level data transmission stream such as STM-x or STM-xc being formed on the base of the data stream VC4 or VC4xc respectively, wherein the DQB may be formed in one of overhead bytes forming the Section Overhead (SOH) of the stream STM-x or STM-xc. In this case the DQB is generated only for the internal use, i.e., for selecting the best trail inside a network element, without outputting the DQB to the network. The reason is that the SOH bytes are free for capturing only between the moment they are analyzed at the NE input and the moment they are filled again at the NE output.

According to another aspect of the invention, there is provided a network element (NE) for telecommunication networks operating according to digital transmission systems SDH/SONET, the NE being capable of forming a combined alarm report byte named a Data Quality Byte (DQB) by arranging a plurality of alarm status signals, currently actual for a data transmission stream, in a predetermined byte (or a portion of said byte) associated with a standard frame of said stream.

The network element (NE) may constitute, for example, an ADM (add-drop multiplexer), a cross-connect, etc.

Preferably, the network element (NE) is capable of
receiving the data transmission stream carrying its Data Quality Byte DQB1, from an upstream network element,
forming an updated Data Quality Byte DQB2 actual for the received data transmission stream, the NE being also capable of
comparing the updated DQB2 with the DQB1 received with said stream from the upstream network elements to obtain an alarm status change ΔDQB.

According to another embodiment, the network element (NE) can further be capable of receiving two or more originally identical incoming data streams transmitted via respective two or more sub-paths forming a protected path in the network, and of producing one outgoing data transmission stream having the best possible quality; said outgoing data transmission stream being produced by comparing two or more Data Quality Bytes (DQB) of the respective incoming data transmission streams, and by selecting the incoming data transmission stream having the best DQB as said outgoing data transmission stream.

As has been explained, the Data Quality byte is considered to constitute the best DQB if it comprises the less harmful combined alarm report in comparison with those of other DQ bytes considered, i.e. characterizes the less distorted data stream.

It should also be noted that the NE may combine the two above-described functions, i.e., both comparing the received DQB with the updated DQB for further reporting the alarm status change, and the selection of the outgoing data stream from a number of incoming alternate data streams by comparing the DQB thereof.

The network element can be provided with means for forming the DQB in one of stuff bytes comprised in the standard frame of either the mentioned data stream, or one of the higher level streams formed on the base of this stream. For example, the data stream may be one of the following SDH data transmission streams: VC4 (including VC4-x regular and VC4-xc concatenated), VC3, VC2, VC11, VC12, and the respective higher level streams: AU3, AU4, TU2, TU11, TU12, etc. In one particular embodiment intended for comparing data streams in alternative paths, a predetermined DQB byte may constitute one of the SOH bytes (for STM-N data stream).

According to yet another aspect of the invention, there is provided an input/output (I/O) bidirectional interface module for use in the network element (NE), in conjunction with a functional matrix of the NE;
the module being capable of generating a combined alarm status byte named a Data Quality Byte (DQB) by arranging a plurality of alarm signals, currently actual for a data transmission stream, in a predetermined byte associated with a standard frame of said stream; the module comprising:
an inputting functional portion having one input and a pair of outputs, and being capable of receiving an incoming data stream via said input, forming a DQB of said stream by non-intrusive monitoring thereof and conducting said stream with the DQB to said pair of outputs thus forming a first pair of alternative data streams for routing by the functional matrix;
an outputting functional portion having a pair of inputs and one output, and being capable of receiving, via said inputs, a second pair of alternative data streams from the functional matrix, comparing DQB of the alternative data streams of said second pair, and capable of outputting, via said output, the data stream characterized by the best DQB.

Preferably, the module is capable of outputting said data stream with the DQB incorporated therein.

It should be noted that the first pair and the second pair of alternative data streams generally mean two different pairs, though in a specific case they may be the same.

Consequently, there is also provided a network element (NE), comprising a functional matrix and a plurality of I/O interface modules as defined above, the modules being interconnected via the functional matrix; said NE is capable of forming DQB for a number of incoming data transmission streams entering said functional matrix, and capable of outputting at least some of data transmission streams outgoing from said functional matrix. Preferably, the output stream(s) produced by said network element carry respective data quality byte(s) (DQB).

BRIEF DESCRIPTION OF THE DRAWINGS

FIGS. 3a, 3b and 3c are schematic representations of standard frames of the SDH data transmission streams TU-11, TU-12 and TU-2 respectively, showing V4 byte positions suitable for transmitting the Data Quality Byte.

DETAILED DESCRIPTION OF PARTICULAR IMPLEMENTATIONS

Figure 1:
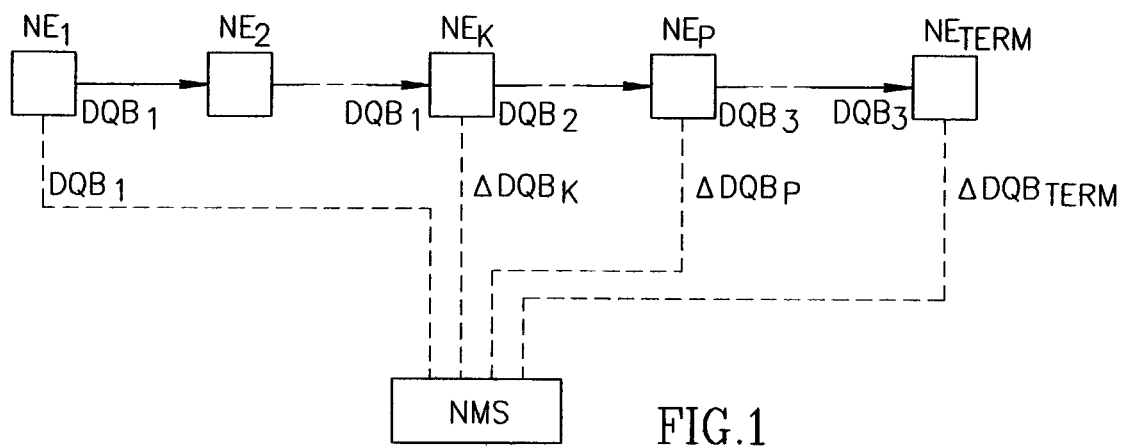
FIG. 1 is a schematic block-diagram illustrating one version of the method according to the invention and network elements suitable for implementing this version.

FIG. 1 illustrates an elementary path 10 in a network; let a particular SDH or SONET data transmission stream is transmitted from the source network element NE1 towards a termination network element NEterm. The NE1 equips the data stream with a data quality byte DQB1 which comprises a combined alarm report (status) actual for the moment of transmitting the stream from NE1. This DQB1 is transmitted with the stream from NE1, and can also be sent as a reference signal to the network management system NMS. Suppose NE2 is a regular network element, which is not provided with the ability of forming or processing DQB. The data stream, bearing the DQB1, is therefore "transparently" transmitted there-through to other network elements in the path which, in this drawing, also are not equipped with any DQB updating means. The stream is thus received, with the same DQB1 byte, by a network element NEk. However, errors and alarms may and will usually accumulate in the stream on its way. The network element NEk is capable of forming an updated data quality byte DQB2, based on errors and alarms which could accumulate in the received stream up to the NEk. The NEk is also equipped with means for comparing the received DQB1 with the updated DQB2 and for generating a report on the alarm status at the particular point ("k"), based on the comparison. The report is called ΔDQBk. This report will manifest to the NMS new errors and alarms, which accumulated in the data stream during the transmission along the network section between NE1 and NEk; in other words, it will reflect the quality of this network section. The stream equipped with the updated DQB2 is further transmitted via the network. The next check is performed at a network element NEp where the DQB2 will be updated and become DQB3, and the difference therebetween will be reported to the NMS in the form of the alarm status report at point "p" (marked ΔDQBp). The stream will be transmitted further with the updated data quality byte DQB3. Finally, the terminal network element NEterm which receives the data stream with an updated data quality byte (say, it is still DQB3), may also be equipped with means for forming its own (the terminal) DQB and comparing it with the received DQB3. In this case, an alarm status report of the terminal point of the network (ΔDQBterm) can be supplied to the NMS in order to complete representation of the network quality at different points thereof.

Signaling links between NE and NMS are schematically shown by dotted lines. It should be noted, however, that the NMS may acquire the ΔDQB information from the network elements either inband (i.e. via control channels of SDH, for example by so-called DCC bytes) or outband (i.e., via a separate signaling system established between MMS and each network element equipped with DQB generation means).

It should be noted that if a more systematic check of the network sections' quality is required, more (if not all) of the elements in the network may be provided with the above-described ability.

Figure 2:
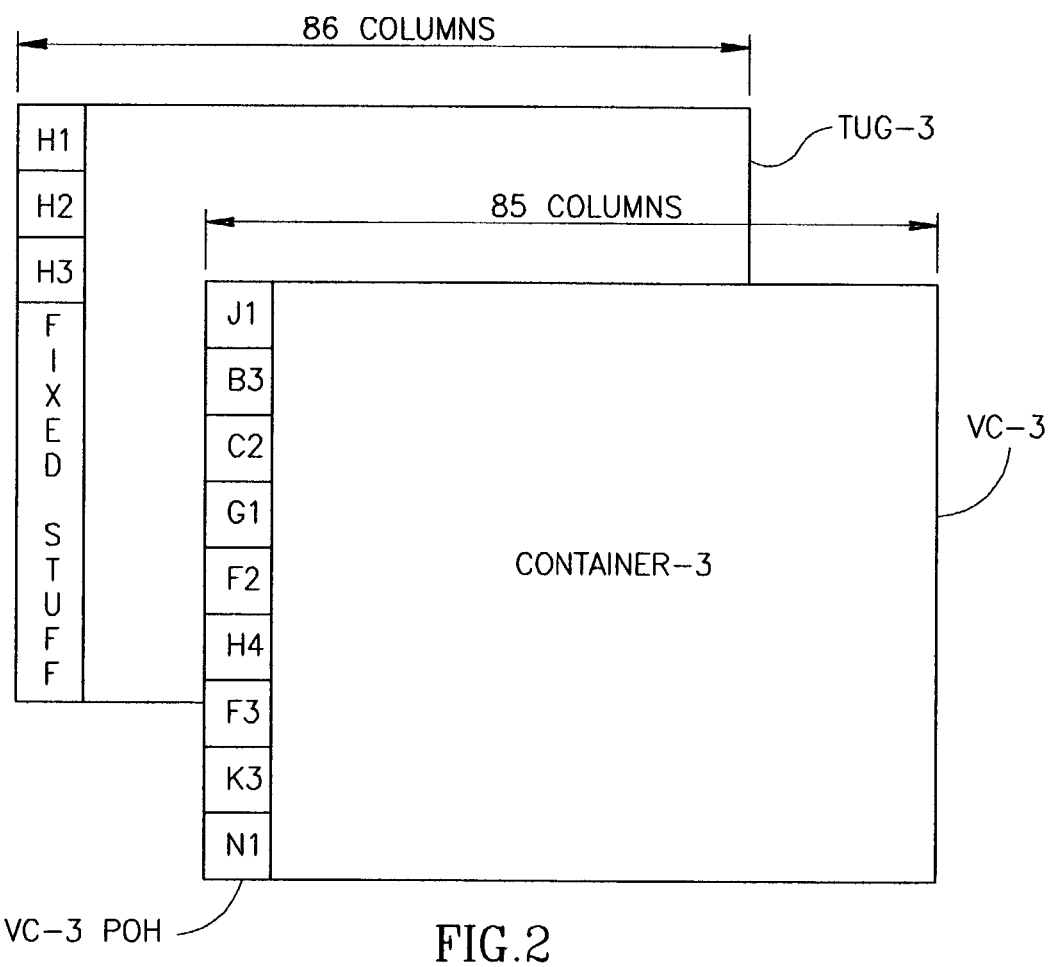
FIG. 2 is a schematic representation of a standard frame of the SDH data transmission stream TU-3 (formed from VC-3) where stuffed bytes are shown, suitable for being captured for carrying the combined Data Quality Byte.
Figure 4:
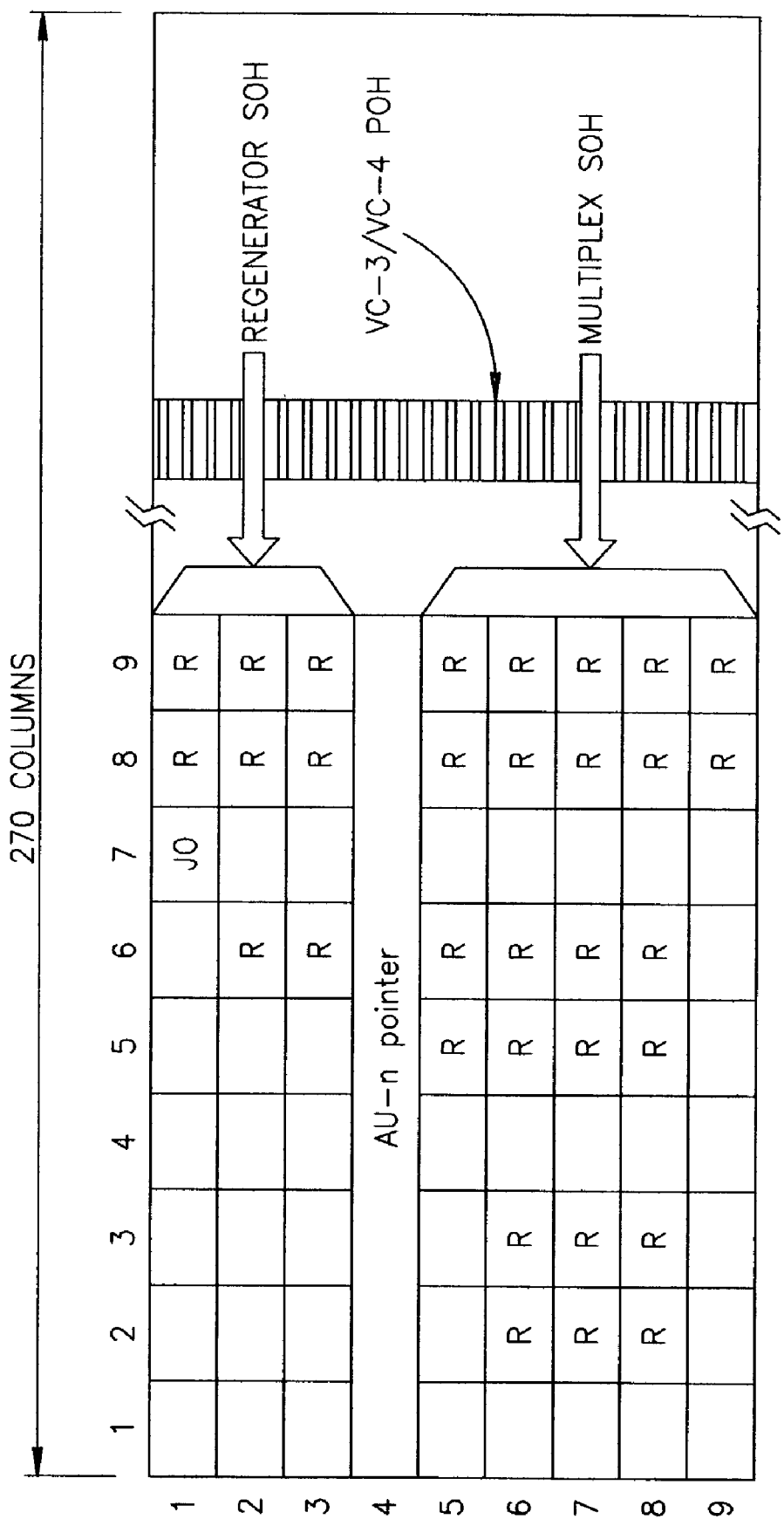
FIG. 4 schematically shows a standard frame of the SDH signal STM1 with SOH bytes, which can be used for carrying the Data Quality Byte in another version of the method.

FIGS. 2 to 4 will present particular examples of capturing various bytes for bearing the DQB byte in different data transmission streams. For the purposes of network correlation, the following bytes can be used:

SDH mode: VC-4 path Data Quality bytes can be any bytes from SOH which are reserved, stuffed, unused, intended for national use or the like, SONET mode: all 3 AU-3 path Data Quality bytes can be any bytes from SOH which are reserved, stuffed, unused, intended for national use and the like, Low-order VC12/2/3 Data Quality bytes: V4 or other unused bytes for VC-12 or VC-2, and stuffed bytes for VC-3.

For data protection in the path, or any other operation taking place in a network element (intra-NE operation), there are more bytes which could be used as a DQB, for example J0 in SOH, etc.

FIG. 2 shows a schematic representation of a standard frame of the SDH lower order data transmission stream VC-3 with a column of POH bytes at its left side, and a corresponding frame of the TU(G)-3 provided with pointers and an additional column of stuffed bytes. Any of the stuffed bytes from the stuffed area shown in the figure is suitable for serving as a combined Data Quality Byte.

FIGS. 3a, 3b and 3c respectively illustrate schematic representations of standard frames of the SDH lower order data transmission streams TU-11, TU-12 and TU-2. Each of the illustrated frames comprises byte V4 suitable for transmitting the Data Quality Byte according to the invention. If desired, byte V3 can be used as an alternative option.

Figures 5, 6:
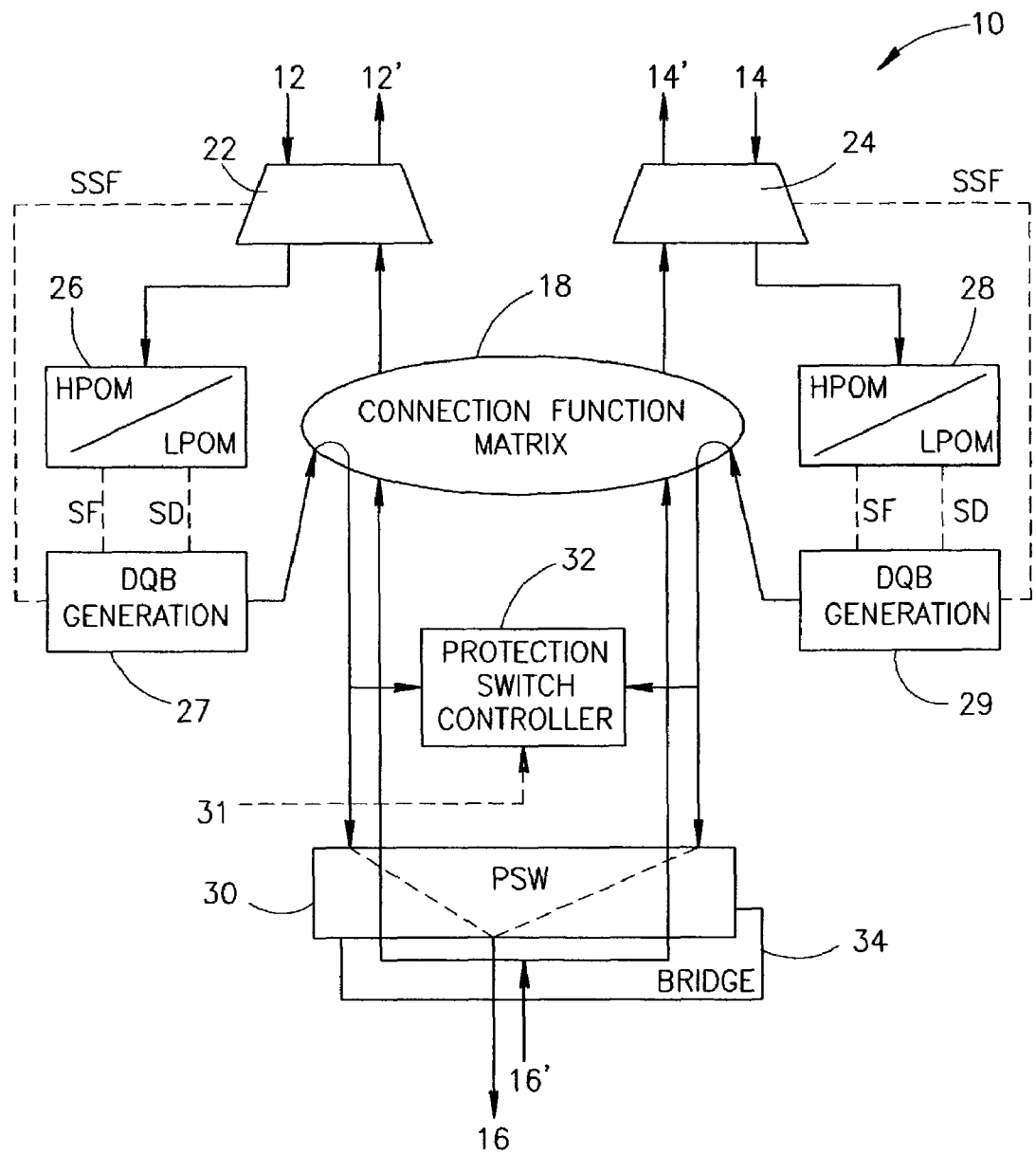
FIG. 5 is an exemplary tabular representation of contents of the Data Quality Byte in Low order data streams.
FIG. 6 is a schematic representation of a network element, which, according to another version of the method, performs selection of an active trail from two trails transmitted via two respective alternate paths.

FIG. 4 is an illustration of a standard frame of the SDH high order signal STM1 with its SOH (Section Overhead) bytes. The stream STM1 is selected as an example only. The SOH bytes of the STM1 signal may be used for carrying the Data Quality Byte inside a network element between the moment when SOH of the signal is dismantled and the moment it is re-assembled for further transmission in the standard frame of the stream. An example, where SOH bytes can be used for transporting the DQB within the network element, is shown in FIG. 6 illustrating performance of a so-called path protection function. Reserved bytes marked "R" may also be used for the network monitoring function shown in FIG. 1.

FIG. 5 is an exemplary tabular representation of contents of the Data Quality Byte. It can be used both in High order, and in Low order data streams. In a particular example, the High order VC Data Quality Byte is generated by a so-called HPOM function, i.e. the function of High Order Path Overhead Monitor which will also be mentioned in the description to FIGS. 6 and 7. All abbreviations given below, with the respective explanations, can be found in the ITU-T Standard Recommendation G.783, 1/94.

Bit "7" informs on the presence of the most important SSF alarm (i.e., Server Signal Failure);

Bit "6" reflects an alarm SF1, being indication of signal fail (SF) owing to a so-called "unequipped" state; it is determined based on analysis of bytes C2 or V5 of the stream;

Bit "5" is reserved for future use (ignored);

Bit "4" indicates the presence of alarm SF2, reflecting the signal failure due to trace indication mismatch (TIM); TIM is determined based on analysis of traces created by bytes J1 or J2 of the stream;

Bit "3" comprises a configurable SF/SD (Signal Failure/Signal Degrade) alarm which depends on a particular selected configuration;

Bit "2" comprises an alarm SD1 being a standard "Signal Degraded" alarm;

Bit "1" indicates an SD2 alarm, for example an alarm detecting High BER level $10^{-9}$ in the stream (a probabilistic error criterion);

Bit "0" is ignored (reserved for future use).

The above combination has been presented as one particular option suitable for some implementations according to the present invention. However, the data quality byte may comprise other alarm indications, or may be captured partially, for example including five basic alarm indications in five bits of the byte: SSF, SF1(unequipped), SF2(TIM), SF3(PLM—path label mismatch) and SD.

If required, some of the bits in the DQB may be disregarded in advance (for example, where specific alarms corresponding to these bits are not supported by the network). It can be accomplished by using so-called masks, which can be selected according to each specific application. For example, only three basic alarms may remain in the DQB after the masking: SD, SF (being taken as SF1v SF2 v SF3), and SSF.

It should further be explained that the DQB example presented in FIG. 5 and those discussed in the related description all belong to a bit-oriented form of representation. However, code representations of alarms and their combinations are also possible. For example, three basic alarms and a state where no alarms exist might be represented by a two-bit code: 11 for SSF, 10 for SF, 01 for SD and 00 for OK. Such a representation, though being compact, suffers from a disadvantage that it cannot be masked, i.e., neither of the alarms can be disregarded after they have been generated.

FIG. 6 illustrates a novel functional model for protection data transmitted via alternate paths, using the method according to the invention. A network element (NE) 10 is responsible for selecting one of two trails arriving to the NE via two alternative paths 12 and 14 in the network. One so-called active trail (path) 16 is selected from the two alternative trails respectively transmitted via a so-called main path (12) and a so-called protecting path (14). In the opposite direction, the NE 10 is capable of forming, from one active trail 16', two trails for transmitting thereof via a working path (12') and a standby path (14'). The network element 10 comprises a matrix 18 implementing a cross-connect function only. For comparing the two alternate trails received from the main path 12 and the protecting path 14, a controllable switch 30 is provided. For comparing the alternate trails and selecting one of them, a number of alarm indications should usually be analyzed, for example SD (signal degrade), SF (signal fail), SSF (server signal fail or alarm indication signal in the higher order virtual container) and others. In the proposed functional model, the matrix is not loaded by extracting and analyzing separate alarms from data streams passing there-through. It should be noted, that if matrices of relatively simple cross-connects might perform such analysis, it becomes problematic for complex cross-connects that must perform thousands of connections between numerous inputs and outputs at a time. So, the proposed alleviation of the matrix function in cross-connects is extremely advantageous, especially for complex ones.

How the data analysis is performed in the illustrated functional model? A combined Data Quality byte (DQB), proposed by the invention for manifesting alarms, is formed for each trail entering the network element 10, upon so-called adaptation. Respective blocks 22 and 24, which are responsible for synchronizing the incoming data streams using their pointers, perform the adaptation. Further, by non-intrusive monitoring of the respective trails, the following operations are performed. Input/output interface units 26 and 28 labeled HPOM/LPOM (High Order stream Path Overhead Monitor/Low Order stream Path Overhead Monitor, depending on the stream of interest) are responsible for recognizing at least some standard alarms in the respective trails: SD, SF; SSF is recognized by blocks 22 and 24. Based on the recognized alarms, DQB generators 27 and 29 generate respective data quality bytes (DQB12 for trail 12 and DQB14 for trail 14), thereby fulfilling the function of HPOM/LPOM. The DQB12 and DQB14 of the alternate trails are further integrated in the respective data quality streams, by capturing a particular selected byte. The DQB12 and DQB14 are read from the respective data streams by a protection switch controller 32. Matrix 18 of the NE 10 conducts both of the trails transparently without selecting any of them, just issuing a routing instruction (i.e. an instruction defining an outlet of the network element 10 to which one of those streams should be connected).

The function of selecting one of the trails is performed by a switch 30 controlled by the protection switch controller 32; the latter compares DQBs of the alternate trails and causes the switch to output, as an active stream (16), the data stream having the better DQB. External commands 31 can also be taken into account. The better DQB is understood as a DQB bearing information on less or equally harmful alarms in respect of the one compared therewith. Usually, the DQB of the active stream remains incorporated therein; both the captured byte and the information in the byte can therefore be used by downstream network elements.

The NE 10 is operative also in the opposite direction; it comprises a bridge 34 forming part of its I/O circuitry. The bridge serves for receiving an incoming active single trail 16' and transferring it into the matrix 18 in the form of two alternative trails, each being a copy of the incoming trail but provided with a DQB. In this mode, the matrix 18 transparently conducts the two alternative trails and routes thereof to two alternative paths 12' and 14' via the respective blocks 22 and 24.

Creating the DQB at inputs of the network element and selecting the "outgoing" DQB (and trail) at outputs thereof enables the following improvements to be obtained:
  enhanced manifesting of pending alarms for each alternative trail incoming the NE,
  simplified handling of the trails by the network element (since the trails are just transparently conducted through the matrix, along with their respective DQBs), and
  enhanced manifesting of the alarm status in the trail outgoing from the network element.

If desired, the input-output blocks 22, 24, 26, 27, 28, 29, 30 and 34 at the input and output sides of the network element 10 can be composed of one or more bidirectional I/O modules suitable for being arranged in various combinations to function in the receiving and/or the transmitting mode. Such a module will be schematically illustrated in FIG. 7 below.

It should be appreciated, that a number of modifications may be introduced in the described network element for adjusting it to the function of network correlation, i.e. in order to make it suitable for receiving an incoming data stream carrying its previously formed DQB1, generating DQB2 actual for the trail as received, and issuing a report on the DQB change ($\Delta$DQB) based on the compared DQB1 and DQB2.

Figure 7:
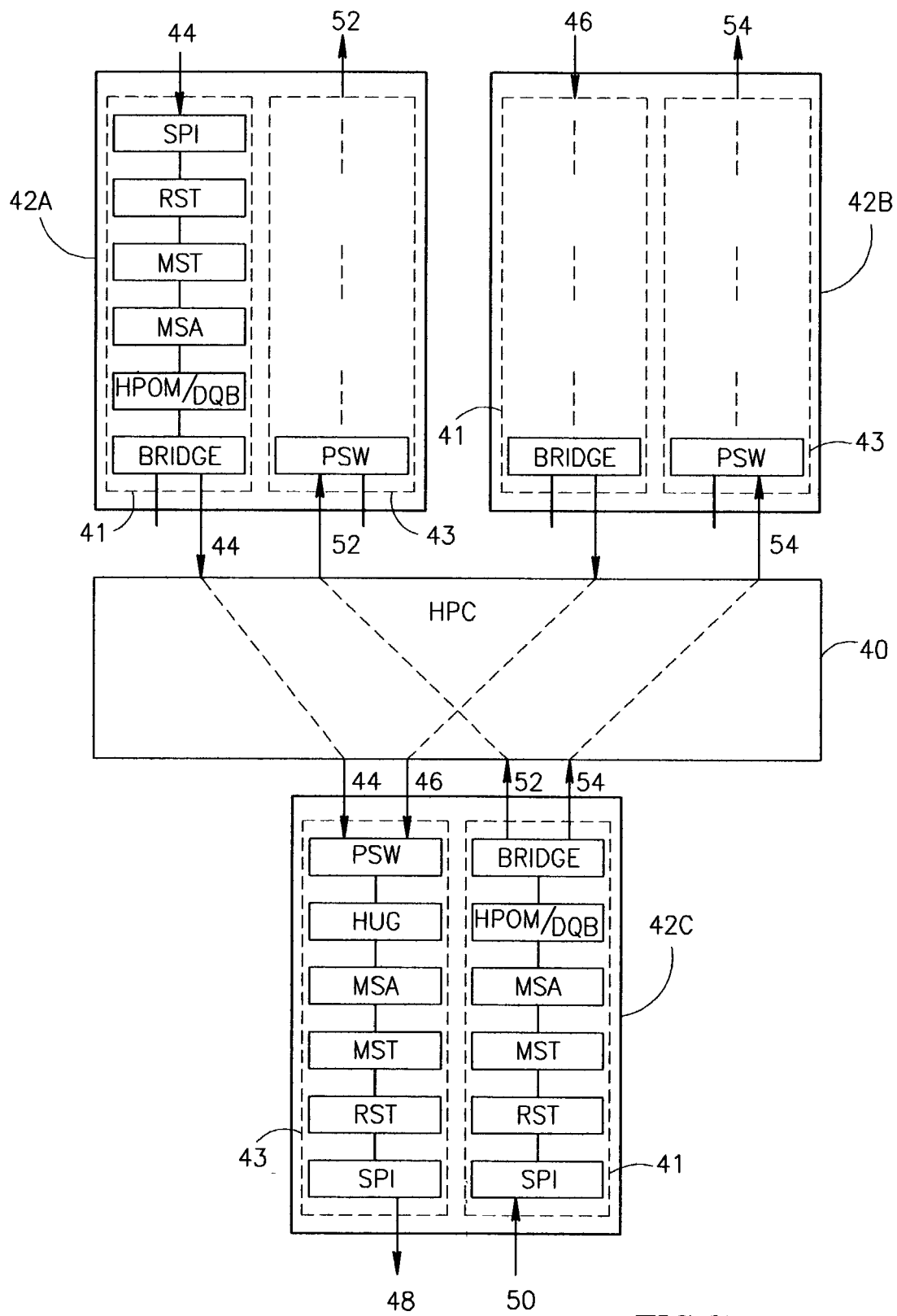
FIG. 7 illustrates a schematic block-diagram of a bidirectional I/O module intended for building the input-output circuitry of the network element shown in FIG. 6, and a way of composing such modules in the circuitry.

FIG. 7 presents a schematic block-diagram of a bidirectional I/O module intended for building input-output circuitry of network elements suitable for generating data quality bytes (DQB) in SONET/SDH networks, and the way of composing such modules around a matrix to form a network element (for example, a cross-connect). The present example shows functional blocks relating to treatment of Higher Order stream streams, such as STM-x. A matrix 40, which in this drawing is marked HPC (i.e. performing a function of High Order Path Connection, actually—cross-connecting) is coupled to a plurality of I/O modules 42 each comprising a switch, a bridge and at least one DQB generating block.

For the sake of simplicity, three I/O modules are shown in the figure and marked 42A, 42B and 42C. Each of the modules comprises a functional portion taking care of an incoming trail and providing it with its DQB (portion marked with a dotted contour 41), and a functional portion handling an outgoing trail to be selected from two incoming trails (marked with a dotted contour 43). In this figure, for example, one trail 44 is handled by functional portion 41 of the module 42A and routed by the HPC matrix 40 to a protection (selecting) switch in the functional portion 43 in the module 42C. An alternative incoming trail 46, to be compared with the first trail 44 for selecting an outgoing one, arrives to portion 43 of the module 42C from portion 41 of another I/O module 42B, via the matrix 40. Actually, the output of each functional portion 41 is provided with a bridge capable of splitting the incoming trail into two alternative trails. According to a particular application, either one or both of them can be used. In the functional portions 41 in modules 42A and 42B, only one trail leaving the bridge is utilized.

However, the similar module may serve for another application. Suppose, a trail 50 arrives to an I/O module 42C and the network element is responsible for creating a protected path, i.e. for routing the trail 50 signal along a pair of independent outgoing paths in parallel. The functional portion 41 of the module 42C fits the signal with the DQB and splits it, by the bridge, into two trails 52 and 54. The matrix 40 routes these two trails to different I/O modules 42A and 42B respectively, more particularly to their functional portions 43. If no second signal is entered to the protection switch of a functional portion 43, it will output the only trail that has been routed thereto. It means, that the module 42A will output the trail 52 and the module 42B—the trail 54.

In yet another case which is not illustrated in the drawing, trails 52 and 54 may be compared in one functional portion 43, thereby performing a known function of the equipment (matrix) check.

It can be seen that while the functional portion 41 is capable of issuing two outputs, the functional portion 43 is operative to process two inputs. It goes without saying, that both the number of required I/O modules 42, and the question of how many outputs and inputs of their functional portions 41 and 43 will be used (and in what combinations) are defined according to each specific application.

To briefly explain the functionality of portion 41, the following blocks are shown in the drawing, which consequently perform suitable functions with an incoming trail (all the following abbreviations can be found in the ITU-T standard Recommendation G.783. 1/94):

SPI—Synchronous Physical Interface (of the incoming/outgoing signal),

RST—Regenerator Section Termination;

MST—Multiplex Section Termination;

MSA—Multiplex Section Adaptation, i.e. synchronization of the signal, using pointers, HPOM—Higher order POH Monitor, according to the standard, is processing the alarms including those appearing in the path but not affecting the traffic; according to the present invention, DQB is generated based on the collected alarm information. (In a similar way, LPOM is provided for low order data streams).

Bridge—forwarding the trail to two outputs of the portion 41 (copying the incoming signal, with the DQB, to two outputs).

Similarly, the functionality of portion 43 can be explained using the following blocks which consequently perform functions with trails obtained from the matrix:

Protection Switch—comparing two trails, if obtained from the matrix, and selecting the one with the better DQB, HUG—High order Unequipped Generator (an optional function), MSA, MST, RST and SPI—are blocks analogous to those in the functional portion 41, for gradually assembling the signal to be output from the network element.

The trail, selected by the protection switch, may retain information in the DQB which will be thus transmitted in this stream when outgoing from the NE. One may therefore notice that the inventive idea of the combined alarm manifesting can be implemented in the same NE equipment both for the purpose of network coordination (i.e., for detecting faulty sections in the network), and for the purpose of data protection in the path (by selecting the less distorted data from that transmitted via alternative paths).

It should be appreciated that other embodiments of the inventive system, the mentioned network elements or of the described module might be proposed, which should be considered part of the present invention.

The invention claimed is:

1. A method for manifesting alarms in a telecommunication network formed by interconnected network elements and operating according to digital transmission systems SDH/SONET, the method comprises arranging a combined alarm status byte called Data Quality Byte (DQB) of a data transmission stream, the DQB being formed in a predetermined byte associated with said stream's frame to bear indications of one or more alarm signals currently actual for said data transmission stream, the method further comprising performing the following steps at least at one network element of the telecommunication network:

receiving from an upstream network element the Data Quality Byte (DQB1) formed in said data transmission stream, forming, at said network element an updated Data Quality Byte (DQB2) actual for the received data transmission stream, and comparing the DQB1 received from the upstream network element with the updated DQB2 formed at said network element to manifest an alarm status change ΔDQB.

2. The method according to claim 1, comprising monitoring said network using the alarm status changes ΔDQB manifested at two or more said network elements, for allocating particular portions of the network where new alarms are generated.

3. The method according to claim 1, including arranging the DQB in one of stuff bytes comprised in the standard frame of either said stream, or one of the higher level streams formed on the base of said stream.

4. The method according to claim 1, comprising:

performing the method with respect to two or more originally identical data streams transmitted via alternative paths, thereby obtaining two or more respective Data Quality Bytes (DQB);

comparing the two or more respective Data Quality Bytes (DQB) of said streams to determine the best Data Quality Byte, and selecting from said streams, for further use, the stream with the best Data Quality Byte (DQB).

5. The method according to claim 1, further comprising a step of transmitting the updated DQB2 downstream, with the data transmission stream outgoing from said network element.

6. A network element (NE) for a telecommunication network operating according to digital transmission systems SDH/SONET, the NE comprising a DQB generator for forming a combined alarm status byte named a Data Quality Byte (DQB) in a predetermined byte associated with a standard frame of a data transmission stream, by arranging the DQB from a plurality of alarm status signals, currently actual for the data transmission stream, the network element (NE) also comprises an input/output interface unit and a comparator unit, and is arranged so that, when the NE is inserted in the operating telecommunication network, the input/output interface unit receives an incoming data transmission stream carrying its Data Quality Byte DQB1, from an upstream network element;

the DOB generator forms an updated Data Quality Byte DQB2 actual for the received incoming data transmission stream, the comparator unit compares the updated DQB2 with the DQB1 received with said incoming data transmission stream from the upstream network element and obtains an alarm status change ΔDQB.

7. The network element (NE) according to claim 6, wherein the DQB generator serves for arranging the DQB in one of stuff bytes comprised in the standard frame of either said data transmission stream, or one of the higher level streams formed on the base of said data transmission stream.

8. The network element (NE) according to claim 6, wherein said comparator unit is provided with a communication block for manifesting the obtained alarm status change ΔDQB to a network management system.

9. The network element (NE) according to claim 6, wherein said input/output interface unit serves for receiving at the NE two or more originally identical incoming data transmission streams transmitted via respective two or more sub-paths forming a protected path in the network, and also for outputting from the NE one outgoing data transmission stream having the best possible quality; said outgoing data transmission stream being produced by said comparator unit serving as a switch, by comparing two or more Data Quality Bytes (DQB) of the respective incoming data transmission streams, and by selecting the incoming data transmission stream having the best DQB as said outgoing data transmission stream.

10. The network element (NE) according to claim 6, comprising a functional matrix interconnected with the input/output interface unit in the form of at least one input/output (I/O) bidirectional interface module, and wherein the module comprising:

an inputting functional portion having one input and a pair of outputs, for receiving an incoming data stream via said input, forming said DQB of said stream by non-intrusive monitoring thereof and conducting said stream with the DQB to said pair of outputs thus forming a first pair of alternative data streams for routing by the functional matrix; an outputting functional portion having a pair of inputs and one output, for receiving, via said inputs, a second pair of alternative data streams from the functional matrix, comparing DQB of the alternative data streams of said second pair, and for outputting, via said output, the data stream characterized by the best DQB.

11. The network element according to claim 10, wherein said module performs outputting said data stream with the best DQB incorporated therein.

12. The network element according to claim 10, wherein said module is forms the DQB in an SOH portion associated with said data stream.

13. A method for manifesting alarms in a telecommunication network formed by interconnected network elements and operating according to digital transmission systems SDH/SONET, the method comprises arranging a combined alarm status byte called Data Quality Byte (DQB) of a data transmission stream, the DQB characterizing ciuality of data transmitted by said stream and being formed in a predetermined byte of Section Overhead (SOH) associated with said stream's frame to bear indications of one or more alarm signals currently actual for said data transmission stream, wherein said alarm signals reflect alarms selected from a list comprising at least one or more signal degrade (SD) alarms, one or more signal failure (SF) alarms, and a server signal failure (SSF) alarm.

14. The method according to claim 13, including arranging the DQB in the standard frame of either said stream, or one of the higher level streams formed on the base of said stream.

15. The method according to claim 13, wherein the following steps are performed at least at one of said network elements:

receiving from an upstream network element the Data Quality Byte (DQB1) formed in said data transmission stream, forming, at said network element, an updated Data Quality Byte (DQB2) actual for the received data transmission stream, and comparing the DQB1 received from the upstream network element with the updated DQB2 formed at said network element to manifest an alarm status change ΔDQB, thereby enabling simplified monitoring of the network for allocating particular portions thereof where new alarms are generated.

16. The method according to claim 10, comprising:

performing the method with respect to two or more originally identical data streams transmitted via alternative paths, thereby obtaining two or more respective Data Quality Bytes (DQB);

comparing the two or more respective Data Quality Bytes (DQB) of said streams to determine the best Data Quality Byte, and selecting from said streams, for further use, the stream with the best Data Quality Byte (DQB).

17. A network element (NE) for telecommunication networks operating according to digital transmission systems SDH/SONET, the NE comprising a DQB generator for forming a combined alarm status byte named a Data Quality Byte (DQB) by arranging a plurality of alarm status signals, currently actual for a data transmission stream, in a predetermined byte of a Section Overhead (SOH) associated with a standard frame of said stream wherein said Data Ouality Byte DQB characterizes quality of data transmitted by said stream, and said alarm signals reflect alarms selected from a list comprising at least one or more signal degrade (SD) alarms, one or more signal failure (SF) alarms, and a server signal failure (SSF) alarm.

18. The network element according to claim 17, wherein said DQB generator serves for forming the DQB in the standard frame of either said stream, or one of the higher level streams formed on the base of said stream.

19. The network element (NE) according to claim 17, further comprising an input/output interface unit and a comparator unit, wherein said input/output interface unit serves for receiving the data transmission stream carrying its Data Quality Byte DQB1, from an upstream network element, said DQB generator serves for forming an updated Data Quality Byte DQB2 actual for the received data transmission stream, said comparator unit serves for comparing the updated DQB2 with the DQB1 received with said stream from the upstream network elements and for obtaining an alarm status change ΔDQB.

20. The network element (NE) according to claim 19, further provided with a communication block for manifesting the alarm status change ΔDQB to a network management system.

21. The network element (NE) according to claim 17, further comprising an input/output interface unit and a comparator unit, wherein said input/output interface unit serves for receiving at the NE two or more originally identical incoming transmission data streams transmitted via respective two or more sub-paths forming a protected path in the network, the input/output interface unit also serves for outputting from the NE one outgoing data transmission stream having the best possible quality; and wherein said outgoing data transmission stream being produced by said comparator unit by comparing two or more Data Quality Bytes (DQB) of the respective incoming data transmission streams, and by selecting the incoming data transmission stream having the best DQB as said outgoing data transmission stream.

22. The network element (NE) according to claim 17, and further comprising a functional matrix and a plurality of I/O interface modules interconnected via the functional matrix;

wherein each of the modules comprising:

an inputting functional portion having one input and a pair of outputs, for receiving an incoming data stream via said input, forming the DQB of said stream by non-intrusive intrusive monitoring thereof and conducting said stream with the DQB to said pair of outputs thus forming a first pair of alternative data streams for routing by the functional matrix;

an outputting functional portion having a pair of inputs and one output, for receiving, via said inputs, a second pair of alternative data streams from the functional matrix, for comparing DQB of the alternative data streams of said second pair, and for outputting, via said output, the data stream characterized by the best DQB, said NE thereby forms a combined alarm status byte named Data Quality Byte (DQB) for any incoming data transmission stream entering said functional matrix, and outputs at least some of data transmission streams outgoing from said functional matrix.

* * * * *